United States Patent [19]

Hebrard et al.

[11] Patent Number: 5,034,369
[45] Date of Patent: Jul. 23, 1991

[54] NOVEL CATALYSTS FOR THE TREATMENT OF GASEOUS EFFLUENTS CONTAINING OXIDIZABLE SULFUR POLLUTANTS

[75] Inventors: Jean-Luc Hebrard, Paris; Eric Quemere, Cormeilles-en-Parisis, both of France

[73] Assignee: Rhone-Poulenc Chimie, Courbevoie, France

[21] Appl. No.: 402,792

[22] Filed: Sep. 5, 1989

[30] Foreign Application Priority Data

Sep. 2, 1988 [FR] France ................... 88 11494

[51] Int. Cl.$^5$ .................. B01J 32/00; B01J 35/02
[52] U.S. Cl. .................... 502/304; 502/349; 502/350; 502/355; 502/439; 502/527; 423/570
[58] Field of Search ............ 502/527, 439, 304, 349, 502/350, 355; 423/570

[56] References Cited

U.S. PATENT DOCUMENTS

| | | | |
|---|---|---|---|
| 3,857,780 | 12/1974 | Gustafson | 502/527 X |
| 3,864,459 | 2/1975 | Stiles | 423/570 X |
| 3,865,927 | 2/1975 | Watson | 423/570 |
| 3,928,547 | 12/1975 | Daley et al. | 423/570 X |
| 4,133,777 | 1/1979 | Frayer et al. | 502/527 X |
| 4,328,130 | 5/1982 | Kyan | 502/527 X |
| 4,394,303 | 7/1983 | Gibson | 502/527 X |

Primary Examiner—W. J. Shine
Attorney, Agent, or Firm—Burns, Doane, Swecker & Mathis

[57] ABSTRACT

Novel catalysts for the purification of gaseous effluents containing contaminating amounts of sulfur compounds include a catalytically active phase for the oxidation of such sulfur compounds into elemental sulfur, $SO_2$ and/or $SO_3$ and are shaped as to have a ratio between their external surface area and their volume of at least 2 $mm^{-1}$; advantageously such catalysts have a concave multilobal configuration, preferably trilobal or quadrilobal.

22 Claims, No Drawings

NOVEL CATALYSTS FOR THE TREATMENT OF GASEOUS EFFLUENTS CONTAINING OXIDIZABLE SULFUR POLLUTANTS

BACKGROUND OF THE INVENTION

1. Field of the Invention

The present invention relates to novel catalysts for the treatment of gases, in particular gaseous industrial effluents containing sulfur compounds, to catalytically convert such sulfur compounds into compounds that are more easily removed from said effluents.

This invention especially relates to novel catalysts for the direct oxidation of hydrogen sulfide or carbon compounds of sulfur into elemental sulfur, $SO_2$ and/or $SO_3$.

2. Description of the Prior Art

Certain industrial effluents and in particular the effluents emanating from Claus catalysis reactions, known as "tail gas", contain sulfur and/or oxidizable polluting sulfur compounds, which must be converted by oxidation into easily removable compounds, such as sulfur dioxide and/or sulfur trioxide.

The sulfur compounds typically present in such effluents are principally hydrogen sulfide and organic sulfur compounds, such as carbon disulfide, carbon oxysulfide and/or mercaptans.

These effluents may also be treated to convert the sulfur compounds into elemental sulfur by direct oxidation, as elemental sulfur is readily eliminable or recoverable, for example by condensation.

Several processes for the oxidation of these types of compounds are already known to this art. The simplest such process entails incinerating the effluents at elevated temperatures.

However, if the hydrogen sulfide content is too low, it is difficult to maintain a flame temperature high enough to provide a stable combustion of the sulfur compounds.

To treat gases having low hydrogen sulfide concentrations, catalytic processes for the oxidation of sulfur compounds into S, $SO_2$ or $SO_3$ have been proposed to the art.

Among the catalysts proposed, those based on titanium oxide would appear to be particularly effective. Compare EP 115,449, 60,742, 78,690, each of which describe different catalysts based on titanium oxide for use in the oxidation of hydrogen sulfide.

Other catalysts have also been proposed to the art. Thus, U.S. Pat. No. 4,092,404 describes an oxidation catalyst based on vanadium, and EP 39,266 a catalyst based on iron. These catalysts are generally used in the form of a bed of particles placed in a column, with the gaseous flowstreams to be treated being transported through said column.

These catalyst beds known to the prior art included catalyst particles in the form of cylindrical or spherical granules formed by molding or extrusion. However, the amount of the catalyst that it is possible to introduce into a column or a converter is limited by the pressure differential created thereby in the packing of the column, which gives rise to an oxidation yield of the sulfur compounds less than the theoretical yield calculated by the laws of thermodynamics.

SUMMARY OF THE INVENTION

Accordingly, a major object of the present invention is the provision of novel shaped catalyst particulates, preferably polylobal in configuration, which novel catalysts conspicuously ameliorate those disadvantages and drawbacks to date characterizing the state of this art and which result in less of a pressure differential for an identical fill factor in the converters or columns charged therewith.

Furthermore, the shaped catalysts of the invention have an appreciably improved catalytic performance in the oxidation of sulfur compounds and in particular the oxidation of hydrogen sulfide or carbon/sulfur compounds.

While not wishing to be bound by any particular theory, this improvement may be explained by the fact that oxidation reactions are limited by the various phenomena of diffusion of the material into and around the catalyst particles.

Due to this fact, not all of the active sites of the catalyst particle are in contact with the gases to be treated, in particular those located at the core of the particle. Thus, the theoretical activity of the catalyst cannot be realized.

Briefly, the present invention features catalyst particulates shaped for the treatment of gases containing contaminating amounts of sulfur compounds to oxidize such compounds into easily removable sulfur compounds, and in particular into elemental sulfur, $SO_2$ and/or $SO_3$, said catalyst particulates comprising an active element for catalytically oxidizing said sulfur compounds, and said catalyst particulates being shaped as to present a high ratio between their external surface area and their volume, namely, greater than or equal to 2 $mm^{-1}$, and preferably ranging from 3 to 8 $mm^{-1}$.

Preferably, said catalyst particulates are shaped as to have a transverse section in the form of a concave multilobal configuration.

DETAILED DESCRIPTION OF THE PREFERRED EMBODIMENTS OF THE INVENTION

More particularly according to the present invention, in a first embodiment thereof the transverse section of the catalyst is circumscribed in a circle having a diameter of from 0.8 mm to 12 mm, preferably ranging from about 1.2 mm to 9 mm. The lobes of the transverse section preferably are identical in their dimensions and/or shape.

In a second embodiment of the invention, the transverse section of the catalyst is circumscribed in an oval having a large axis ranging from 2 mm to 9 mm, and a small axis ranging from about 1.2 mm to 7 mm. At least one of the lobes of the multilobal shaped particulates is different in its dimensions and/or shape from the other lobes. Preferably, the lobes are identical in pairs and advantageously the identical lobes are not adjacent.

According to the present invention, common to the embodiments described above, the lobes of the polylobal shaped particulates are secants. However, in another embodiment at least two adjacent lobes of the polylobal shaped catalysts are not secants.

In a preferred embodiment of the invention, the polylobal shaped particulates are either trilobal or quadrilobal. The quadrilobal particulates preferably have opposing lobes which are essentially identical in shape and dimension.

According to the present invention, the transverse section of the shaped catalyst comprises at least one opening or longitudinal channel extending therethrough and opening at the two ends of the catalyst, such opening or channel preferably being cylindrical in form.

In a preferred embodiment of the invention, the catalyst has a central channel and a channel in the center of each lobe.

In another embodiment of the invention, the shaped catalyst particulates are cylindrical in form, with the transverse section thereof comprising at least one opening or longitudinal channel extending therethrough and opening at the two extremeties of the catalyst, each such opening/channel preferably being cylindrical in configuration.

Exemplary of such embodiment is a catalyst in the form of cylindrical extrudates having a diameter ranging from 3 to 5 mm and a length ranging from 4 to 8 mm, with a continuous opening extending completely therethrough having a diameter of from $\frac{1}{4}$ to $\frac{3}{4}$ of the diameter of the extrudate.

The catalyst of the invention contains, as the essential active component thereof, a catalytically active element selected from among aluminum oxide, titanium dioxide, cerium oxide, zirconium oxide, or a mixture of these values. The proportion by weight of the catalytically active element relative to the total weight of the finished catalyst advantageously ranges from 0.5% to 100%, and preferably from about 60% to 99%.

For example, titanium dioxide may be used either by itself or in admixture with several other oxides, such as alumina, silica, zirconium oxide, cerium oxide, tin oxide, oxides of trivalent rare earths, molybdenum, cobalt, nickel and iron oxides, or the like. This is also true for the cerium oxide, zirconium oxide and alumina.

The catalyst including, as the catalytically active element phase, an oxide of titanium, cerium, zirconium, aluminum or mixtures thereof may further include at least one oxide of molybdenum, cobalt, silica, trivalent rare earths, nickel, iron, and tin.

The catalytically active elements described above and suitable for the invention are all oxides of such elements, regardless of their mode of preparation or their origin.

The catalysts of the invention may also contain one or more components selected from among the clays, silicates, alkaline earth metal and ammonium sulfates, ceramic fibers, asbestos, silica, and the like.

They may also contain additives to facilitate forming and additives to improve their final mechanical properties.

Exemplary of such additives are cellulose, carboxymethylcellulose, carboxyethylcellulose, tall oil, xanthan gum, surface active agents, flocculating agents such as the polyacrylamides, carbon black, starches, stearic acid, polyacrylic alcohol, polyvinyl alcohol, biopolymers, glucose, polyethylene glycols, and the like.

In another embodiment of the invention, the catalytically active element may be impregnated onto a typically refractory support.

Exemplary of such supports are alumina, silica, cerium oxide, zirconium oxide, titanium oxide, and the like.

The catalyst of the invention may be prepared by different known techniques for the preparation of catalysts, including the shaping thereof.

Thus, for example, the catalyst may be produced by o mixing together the different components of the catalyst and extruding the resulting mineral paste. It is also possible to produce a so-called "solid" catalyst containing the oxide of the catalytically active element, whether or not bonded to at least one of the oxides, such as alumina, zirconium oxide, silica, cerium oxide, tin oxide, titanium dioxide or oxides of trivalent rare earths, or a so-called "impregnated" catalyst, produced by the impregnation of a support shaped according to the invention with a solution of an aluminum, zirconium, cerium, tin, titanium, rare earth or other compound constituting the catalytically active element, for example titanium dioxide.

The above examples of catalyst preparation are illustrative only and it is possible, without departing from the scope of the invention, to use other methods whereby a powder or paste can be converted into a particular shape, such as, for example, molding, compacting, etc.

The process for the oxidation of hydrogen sulfide, carbon compounds of sulfur and possibly sulfur in the gaseous phase into elemental sulfur, $SO_2$ and/or $SO_3$ in the presence of a catalyst of the invention may be carried out by contacting an oxygen-containing gas with the effluent containing the undesirable sulfur compounds. This gas is typically air, optionally air enriched in oxygen or pure oxygen.

The amount of the gas is such that the amount of the oxygen is at least equal to and preferably larger than the stoichiometric amount required for the oxidation of the entirety of the sulfur compounds into S, $SO_2$ and/or $SO_3$.

The process of the invention is advantageously carried out at temperatures higher than 150° C. and preferably at temperatures ranging from 200° C. to 550° C.

The composition of the effluents may vary over wide limits. Generally, the effluents contain less than 15% by volume hydrogen sulfide, preferably 0.5% to 10% by volume.

In order to further illustrate the present invention and the advantages thereof, the following specific examples are given, it being understood that same are intended only as illustrative and in nowise limitative.

EXAMPLE 1

Catalyst A

To a suspension of titanium dioxide, obtained after hydrolysis and filtration by a conventional process of the sulfuric acid decomposition of ilmenite, a suspension of lime was added to neutralize the entirety of the sulfate values. The suspension was dried at 150° C. for 1 hour. The resulting powder was kneaded in the presence of water and nitric acid, in the following proportions:

| | |
|---|---|
| $TiO_2$ powder | 58% |
| $HNO_3$ | 2% |
| $H_2O$ | 40%. |

The paste obtained in this manner was extruded through a die in order to produce extrusions (or extrudates) of a trilobal configuration, having a diameter of the circumscribed circle of 4 mm, and with the secant and identical lobes having a diameter of 1.8 mm.

After drying at 120° C. and calcination at 450° C., the extrudates had the following characteristics:

| | | |
|---|---|---|
| (i) | Diameter of circumscribed circle | 3.5 mm; |
| (ii) | Specific surface (BET) | 120 m$^2$/g; |

-continued

| | | |
|---|---|---|
| (iii) | Total pore volume | 0.35 cm³/g. |

EXAMPLE 2

Catalyst B

From the paste as prepared in Example 1, trilobal extrudates were prepared having a diameter of the circumscribed circle of 1.5 mm and the secant and identical lobes having a diameter of 0.8 mm.

After drying at 120° C. and calcination at 450° C., the extrudates had the following characteristics:

| | | |
|---|---|---|
| (i) | Diameter of the circumscribed circle | 1.5 mm; |
| (ii) | Specific surface (BET) | 124 m²/g; |
| (iii) | Total pore volume | 0.32 cm³/g. |

EXAMPLE 3

Catalyst C

The paste prepared as in Example 1 was extruded through a die to produce a quadrilobal extrudate, the opposing lobes of which were identical and the transverse section of which was circumscribed in an oval having a major axis of 4 mm and a minor axis of 2 mm. The diameter of the larger lobes was 1.8 mm and that of the smaller lobes was 1 mm.

After drying at 120° C. and calcination at 450° C., the extrudates had the following characteristics:

| | | |
|---|---|---|
| (i) | Major axis of the oval | 4 mm; |
| (ii) | Minor axis of the oval | 2 mm; |
| (iii) | Specific surface | 116 m²/g; |
| (iv) | Pore volume | 0.35 cm³/g. |

COMPARATIVE EXAMPLE

Catalyst D

A paste was prepared as in Example 1. This paste was then extruded through a cylindrical die having a diameter of 4 mm.

The extrusions obtained were dried at 120° C. and calcined at 450° C.

The catalyst D had the following characteristics:

| | | |
|---|---|---|
| (i) | Diameter | 3.5 mm; |
| (ii) | Specific surface | 120 m²/g; |
| (iii) | Total pore volume | 0.35 cm³/g. |

Catalytic tests

The purpose of these catalytic tests was to compare the activities of the catalysts exemplified above in the direct oxidation of hydrogen sulfide to sulfur, $SO_2$ or $SO_3$.

A gas having the following composition by volume was introduced into the reactor:

| | |
|---|---|
| $H_2S$ | 1% |
| $O_2$ | 0.5% |
| $H_2O$ | 7% |
| $N_2$ | 91.5%. |

In an isothermal operation, at a temperature of 200° C. and for an identical volume of the reactor filled with the catalyst, the flow rate of the gases was 7,200 h⁻¹ calculated under normal conditions of temperature and pressure.

The contact time of the gases was 0.5 sec.

The activity of the catalysts was compared by measuring the proportion of hydrogen sulfide converted. The results obtained are reported in Table I below:

TABLE I

| Catalyst | $H_2S$ conversion |
|---|---|
| A | 40% |
| B | 44% |
| C | 38% |
| D | 30% |

A similar test was carried out to compare the activities of the exemplified catalysts in the oxidation of carbon/sulfur compounds, and more particularly of $CS_2$.

The gas treated had the following composition by volume:

| | |
|---|---|
| $CS_2$ | 0.3% |
| $O_2$ | 0.95% |
| $N_2$ | 98.75%. |

The operation of the reactor was identical to that described for the oxidation of hydrogen sulfide, but the temperature was 300° C.

As in the preceding test, the activity of the catalysts was determined by measuring the proportion of conversion of the $CS_2$. The results obtained are reported in the following Table II:

TABLE II

| Catalyst | $CS_2$ conversion |
|---|---|
| A | 53% |
| B | 65% |
| C | 50% |
| D | 29% |

While the invention has been described in terms of various preferred embodiments, the skilled artisan will appreciate that various changes may be made without departing from the spirit thereof. Accordingly, it is intended that the scope of the present invention be limited solely by the scope of the following claims, including equivalents thereof.

What is claimed is:

1. A catalyst shaped article adapted for the treatment of gaseous effluents containing contaminating amounts of sulfur compounds, said catalyst comprising a catalytically active phase for the oxidation of such sulfur compounds into elemental sulfur, $SO_2$ and/or $SO_3$ and said catalyst being polylobal and shaped as to have a ratio between its external surface area and its volume of at least 2 mm⁻¹.

2. The catalyst shaped article as defined by claim 1, said ratio ranging from 3 to 8 mm¹.

3. The catalyst shaped article as defined by claim 1, having a concave multilobal configuration.

4. The catalyst shaped article as defined by claim 3, wherein the transverse cross-section of such catalyst is circumscribed in a circle having a diameter of from 0.8 mm to 12 mm.

5. The catalyst shaped article as defined by claim 3, wherein the transverse cross-section of such catalyst is circumscribed in an oval having a major axis of from 2 to 9 mm and a minor axis of from 1.2 mm to 7 mm.

6. The catalyst shaped article as defined by claim 3, wherein the lobes of the multilobal configuration are identical in their dimensions and/or their form.

7. The catalyst shaped article as defined by claim 3, wherein at least one of the lobes of the multilobal configuration is different in shape and/or dimensions from the remaining lobes.

8. The catalyst shaped article as defined by claim 3, wherein at least two adjacent lobes of the multilobal configuration are not secants.

9. The catalyst shaped article as defined by claim 3, having a trilobal configuration.

10. The catalyst shaped article as defined by claim 3, having a quadrilobal configuration.

11. The catalyst shaped article as defined by claim 10, wherein the opposing lobes of such quadrilobal configuration are essentially identical in shape and dimensions.

12. The catalyst shaped article as defined by claim 1, having at least one continuous longitudinal channel extending therethrough.

13. The catalyst shaped article as defined by claim 3, having a central continuous longitudinal channel extending therethrough, and continuous longitudinal channels centrally extending through each lobe thereof.

14. The catalyst shaped article as defined by claim 1, said catalytically active element phase comprising an oxide of titanium, cerium, zirconium or aluminum or mixtures thereof.

15. The catalyst shaped article as defined by claim 1, comprising from 0.5% to 100% by weight of said catalytically active phase.

16. The catalyst shaped article as defined by claim 15, comprising from 60% to 99% by weight of said catalytically active phase.

17. The catalyst shaped article as defined by claim 4, wherein the transverse cross-section of such catalyst is circumscribed in a circle having a diameter of from 1.2 mm to 9 mm.

18. The catalyst shaped article as defined by claim 1, comprising an alkaline earth metal or ammonium sulfate.

19. The catalyst shaped article as defined by claim 1, comprising at least one of silicates, clay, asbestos, and ceramic fibers.

20. The catalyst shaped article as defined by claim 14, further comprising, in admixture with the oxide of titanium, cerium, zirconium, or aluminum, at least one oxide of molybdenum, cobalt, silicon, trivalent rare earths, nickel, iron and tin.

21. The catalyst shaped article as defined by claim 1, said catalytically active phase being impregnated onto a support which comprises alumina, silica, cerium oxide, zirconium oxide or titanium dioxide.

22. The catalyst shaped article as defined by claim 1, cylindrical in configuration and having at least one continuous longitudinal channel extending therethrough.

* * * * *